US009070933B2

(12) United States Patent
Ikeda et al.

(10) Patent No.: US 9,070,933 B2
(45) Date of Patent: *Jun. 30, 2015

(54) NEGATIVE ELECTRODE ACTIVE MATERIAL OF LITHIUM SECONDARY BATTERY, SECONDARY BATTERY USING THE SAME, METHOD FOR MANUFACTURING THE SAME

(75) Inventors: Taisa Ikeda, Kitakyushu (JP); Kazuki Tagawa, Kitakyushu (JP); Hiroshi Ono, Kitakyushu (JP); Hideki Ono, Kitakyushu (JP); Keiji Taura, Kitakyushu (JP); Ryoji Akamine, Kitakyushu (JP); Yoichi Kawano, Kitakyushu (JP)

(73) Assignee: NIPPON STEEL CHEMICAL CO., LTD., Tokyo (JP)

( * ) Notice: Subject to any disclaimer, the term of this patent is extended or adjusted under 35 U.S.C. 154(b) by 294 days.

This patent is subject to a terminal disclaimer.

(21) Appl. No.: 13/286,827

(22) Filed: Nov. 1, 2011

(65) Prior Publication Data
US 2012/0119138 A1 May 17, 2012

(30) Foreign Application Priority Data
Nov. 12, 2010 (JP) ................................ 2010-254036

(51) Int. Cl.
*H01M 4/88* (2006.01)
*H01M 4/133* (2010.01)
*H01M 4/04* (2006.01)
*H01M 4/1393* (2010.01)
*H01M 4/36* (2006.01)
*H01M 4/587* (2010.01)
*H01M 4/62* (2006.01)
*H01M 10/0525* (2010.01)
*H01M 4/02* (2006.01)

(52) U.S. Cl.
CPC ............ *H01M 4/133* (2013.01); *H01M 4/0471* (2013.01); *H01M 4/1393* (2013.01); *H01M 4/364* (2013.01); *H01M 4/587* (2013.01); *H01M 4/62* (2013.01); *H01M 10/0525* (2013.01); *H01M 2004/027* (2013.01); *Y02T 10/7011* (2013.01); *Y02E 60/122* (2013.01)

(58) Field of Classification Search
CPC ..... H01M 4/587; H01M 4/583; H01M 4/622; H01M 4/623; H01M 10/0525; Y02E 60/122; Y02T 10/7011

USPC .................. 252/182.1, 500; 429/231.8, 338; 204/294
See application file for complete search history.

(56) References Cited

U.S. PATENT DOCUMENTS

| 4,188,279 | A | * | 2/1980 | Yan ............................. 204/294 |
| 4,668,595 | A | | 5/1987 | Yoshino et al. |
| 5,093,216 | A | | 3/1992 | Azuma et al. |
| RE34,991 | E | | 7/1995 | Yoshino et al. |
| 2009/0280413 | A1 | * | 11/2009 | Ohta et al. ................. 429/231.8 |
| 2011/0236767 | A1 | * | 9/2011 | Sotowa et al. ................ 429/338 |

FOREIGN PATENT DOCUMENTS

| CA | 1 265 580 A1 | 2/1990 |
| CA | 2 022 191 C | 12/2000 |
| CN | 101087021 A | 12/2007 |
| DE | 690 08 978 T2 | 12/1994 |
| EP | 0 205 856 A2 | 12/1986 |
| EP | 0 418 514 A1 | 3/1991 |
| EP | 1 387 420 A1 | 2/2004 |
| EP | 1 961 700 A1 | 8/2008 |
| JP | 59-78914 A | 5/1984 |
| JP | A-62-090863 | 4/1987 |
| JP | A-01-221859 | 9/1989 |
| JP | A-03-137010 | 6/1991 |
| JP | A-06-005287 | 1/1994 |
| JP | A-08-102324 | 4/1996 |
| JP | A-09-320602 | 12/1997 |
| JP | 4-201015 B2 | 12/2008 |
| JP | 2009-224323 | * 10/2009 ............. H01M 4/58 |
| JP | 2009-231113 | * 10/2009 ............. H01M 4/58 |
| WO | 2009/022664 A1 | 2/2009 |
| WO | WO 2009/104690 A1 | 8/2009 |
| WO | WO 2010/131476 A1 | 11/2010 |
| WO | WO 2010/137249 A1 | 12/2010 |
| WO | WO 2011/068097 A1 | 6/2011 |

OTHER PUBLICATIONS

Feb. 22, 2012 Extended Search Report issued in European Patent Application No. 11188371.6.
Dec. 25, 2014 Office Action issued in Chinese Application No. 201110351067.

* cited by examiner

*Primary Examiner* — Khanh Tuan Nguyen
(74) *Attorney, Agent, or Firm* — Oliff PLC

(57) ABSTRACT

A negative electrode active material of lithium secondary battery includes: at least one of a petroleum-derived green coke and a coal-derived green coke, and at least one of a petroleum-derived calcined coke and a coal-derived calcined coke within a mass ratio range of 90:10 to 10:90, and a phosphorous compound within a range of 0.1 to 6.0 parts by mass in amount equivalent to phosphor relative to 100 parts by mass of the at least one of the green cokes and the at least one of the calcined cokes.

15 Claims, No Drawings

NEGATIVE ELECTRODE ACTIVE MATERIAL OF LITHIUM SECONDARY BATTERY, SECONDARY BATTERY USING THE SAME, METHOD FOR MANUFACTURING THE SAME

CROSS-REFERENCE TO RELATED APPLICATION

This application is based upon and claims the benefit of priority from the prior Japanese Patent Application No. 2010-254036, filed on Nov. 12, 2010; the entire contents of which are incorporated herein by reference.

TECHNICAL FIELD

The present invention relates to a negative electrode active material of a lithium secondary battery, a secondary battery using the negative electrode active material and a method for manufacturing the negative electrode active material.

BACKGROUND ART

Since a lithium secondary battery has a high energy density in comparison with another secondary battery, the lithium secondary battery can be downsized and reduced in weight. In this point of view, the lithium secondary battery is frequently utilized as an electric source of a mobile electric device such as a cellular phone, a personal computer, a personal digital assistant (FDA) and a handy video camera and in the future, the demand as the electric source is promising to be increased more than ever.

In order to cope with energy problem and environmental problem, moreover, an electric vehicle or a hybrid electric vehicle with a combination of a motor driven by a nickel hydride battery and a gasoline engine are developed and diffused conspicuously. In addition, the lithium secondary battery is conspicuously demanded as a storage battery for electric power storage. In these uses, the high performance of the battery to be used is required to be developed more than ever and thus, attention is paid to the lithium secondary battery.

In the lithium secondary battery, various carbon materials with excellent safety and lifetime are generally used as the negative electrode active material. Among the carbon materials, graphite can be obtained at a high temperature at least more than 2000° C., normally within a range of about 2600 to 3000° C. and is excellent material because of having a high energy density, but has some problems in high input/output characteristic and cycle characteristic. In this point of view, for the use of the electric vehicle and the storage battery requiring the high input/output characteristics, for example, low crystalline carbon with low degree of graphitization, which is fired at a lower temperature in comparison with graphite, is mainly researched and used.

In order to respond to the requirement of the high performance of the electric vehicle, recently, the lithium secondary battery is required to be highly developed in performance, which calls for urgent attention. With regard to the characteristics of the lithium secondary battery, the electric potential in the side of the negative electrode is sufficiently reduced to enhance the actual battery voltage and thus exhibit the highly and sufficiently output characteristic.

Moreover, the discharge capacity of the lithium secondary battery is an important characteristic in view of the sufficient supply of a current which is an energy source for the electric vehicle. Furthermore, the ratio of the charging capacity to the discharging capacity, that is, the initial efficiency is required to be set higher in view of the larger amount of discharging current in comparison with the amount of charging current.

In addition, it is preferable that the lithium secondary battery maintains a higher charging capacity even at high current density so as to realize the charging process in a short period of time so that the capacity retention rate of the lithium secondary battery is required to be developed.

Namely, it is required for the lithium secondary battery that the output characteristic, the discharging capacity, the initial efficiency and the capacity retention rate are developed under the proper balance condition.

In order to achieve the aforementioned requirement, as the negative electrode active material of the lithium secondary battery are intensely researched and developed carbon materials such as coke or graphite. In this case, the discharge capacity can be developed, but the initial efficiency cannot be sufficiently developed. Moreover, the actual battery voltage is not sufficient so as not to satisfy the requirement for the high output characteristic and the capacity retention rate with cycle time at present.

In Reference 1, for example, as the negative electrode material utilizing intercalation or doping is disclosed a carbonaceous material defined in specific surface and X-ray diffraction crystal thickness, the carbonaceous material being obtained through the thermal decomposition or carbonization of an organic compound. However, the thus obtained negative electrode material is not sufficient for the use of a vehicle such as the electric vehicle.

In Reference 2, as the negative electrode material is disclosed a carbon material with excellent cycle characteristic and higher discharge capacity, the carbon material being obtained through the thermal treatment for calcined coke as a raw material to remove impurities therefrom under a non-reactive atmosphere. However, the thus obtained negative electrode material is not sufficient in output characteristic and the like for the use of a vehicle such as the electric vehicle.

In Reference 3, as the negative electrode material is disclosed a carbon material, the carbon material being obtained through the thermal treatment for a carbonaceous material with a cover layer which the carbonaceous material has a crystalline structure similar to that of graphite. In Reference 4, as the negative electrode material is disclosed a carbon material with high discharge capacity, the carbon material being obtained through the thermal treatment at low temperature for coke as a raw material under a non-reactive atmosphere to remove impurities therefrom. However, both of the carbon materials are not sufficient in battery characteristics for the use of a vehicle such as the electric vehicle.

In Reference 5, as the negative electrode material is disclosed a thermally treated coke for providing a lithium secondary battery with high charge capacity and discharge capacity, the coke being obtained through the thermal treatment within a temperature range of 500 to 850° C. for a green coke derive from a petroleum or a coal. However, the coke is not sufficient in output characteristic for the use of a vehicle such as the electric vehicle.

The research and development of the negative electrode material of the lithium secondary battery made of the low crystalline carbon material using the coke or the like as the raw material is directed at the improvement in characteristic of the negative electrode material of the lithium secondary battery for the use of an electric source for a small mobile instruments, but, as of now, the research and development of the negative electrode material of the lithium secondary battery is not directed at the enhancement in characteristic of the negative electrode material of the lithium secondary battery with large current input/output characteristics suitable for the use of an electric source for the electric vehicle.

On the other hand, such an attempt as adding various compounds into an organic material or a carbonaceous material to enhance the battery performances is made.

In Reference 6, for example, a negative electrode material obtained by adding a phosphorous compound into an organic material or a carbonaceous material and carbonizing the material is disclosed. However, the negative electrode material is not sufficient in output characteristic for the use of a vehicle such as the electric vehicle.

REFERENCE LIST

Reference 1: JP-A 62-90863
Reference 2: JP-A 01-221859
Reference 3: JP-A 06-5287
Reference 4: JP-A 08-102324
Reference 5: JP-A 09-320602
Reference 6: JP-A 03-137010

DISCLOSURE OF THE INVENTION

Problem to be Solved by the Invention

It is an object of the present invention to provide a new negative electrode active material which can develop the output characteristic of a lithium secondary battery and have actual characteristics such as discharge capacity, initial efficiency and capacity retention rate which are required for the use of a vehicle such as an electric vehicle and a storage battery for electric power storage.

Technical Solution

The present invention relates to a negative electrode active material of lithium secondary battery, including: at least one of a petroleum-derived green coke and a coal-derived green coke, and at least one of a petroleum-derived calcined coke and a coal-derived calcined coke within a mass ratio range of 90:10 to 10:90, and a phosphorous compound within a range of 0.1 to 6.0 parts by mass in amount equivalent to phosphor relative to 100 parts by mass of the at least one of the green cokes and the at least one of the calcined cokes. The inventors have found out that the aforementioned negative electrode active material according to the present invention can sufficiently reduce the electric potential of the negative electrode of the lithium secondary battery so as to enhance the actual battery voltage thereof and have some practical characteristics such as output characteristic, discharge capacity, initial efficiency and capacity retention rate which are required in the use of vehicle installation.

Concretely, the inventors have found out (1) that by using two raw materials with the respective different crystallinity of the green coke derived from the petroleum or the coal and the calcined coke derived from the coal or the like, the electric potential of the negative electrode of the lithium secondary battery can be reduced so that the actual battery voltage of the lithium secondary battery can be enhanced and the output characteristic thereof can be sufficiently enhanced.

Moreover, the inventors have found out (2) that the addition of a phosphorous compound suppresses the crystal growth of the area in the vicinity of the surface of the coke to improve the trade-off relation between the discharge capacity and the initial efficiency conspicuously which is inherently determined on the thermal hysteresis so that the initial efficiency can be maintained highly even though the discharge capacity is increased while the discharge capacity can be maintained highly even though the initial efficiency is increased.

Furthermore, the inventors have found out (2) that the addition of the phosphorous compound into the green coke and the calcined coke can suppress the deterioration of the capacity retention rate while the aforementioned characteristics (1) and (2) remain so as to exhibit the capacity retention rate which can be practically used.

Here, the term "green coke derived from the coal or the like" means a coke obtained through the thermal decomposition and polycondensation of a petroleum-derived heavy oil and/or coal-derived heavy oil at a maximum achieving temperature within a range of 400 to 800° C. for about 24 hours by using a coking machine such as a delayed coker. Moreover, the term "calcined coke derived from the coal or the like" means a coke calcined for the green coke derived from the coal or the like, and a petroleum-derived and/or coal-derived cokes) calcined at a maximum achieving temperature within a range of 800 to 1500° C.

Advantageous Effect

According to the present invention can be provided a new negative electrode active material which can develop the output characteristic of a lithium secondary battery and, have actual characteristics such as discharge capacity, initial efficiency and capacity retention rate which are required for the use of a vehicle such as an electric vehicle and a storage battery for electric power storage.

BEST MODE FOR CARRYING OUT THE INVENTION

Hereinafter, details, other features and advantages of the present invention will be described.

In the negative electrode active material of a lithium secondary battery according to the present invention, first of all, a coal-derived heavy oil or the like is thermally decomposed and polycondensed at a maximum achieving temperature within a temperature range of 400 to 800° C. for 24 hours by using an appropriate coking machine such as a delayed coker to obtain a green coke derived from the coal or the like. Then, the green coke is pulverized into particles with a predetermined size. The pulverization process is conducted by a pulverizing machine industrially available. Concretely, an atomizer, a Raymond mill, an impeller mill, a ball mill, a cutter mill, a jet mill or a hybridizer may be exemplified, but not restrictive.

The heavy oil to be used may be a petroleum-derived heavy oil or a coal-derived heavy oil, but preferably the coal-derived heavy oil because the coal-derived heavy oil is rich in aromaticity so as to have little amounts of impurities such as nitrogen and sulfur causing the irreversible reaction and have little amounts of volatiles.

The green coke derived from the coal or the like is calcined at a maximum achieving temperature within a temperature range of 800 to 1500° C. to produce a calcined coke derived from the coal or the like. The maximum achieving temperature is preferably set within a temperature range of 1000 to 1500° C., more preferably within a temperature range of 1200 to 1500° C. The calcination process may be conducted by using an appropriate calciner such as a Riedhammer oven, a shuttle oven, a tunnel kiln oven, a rotary kiln oven, a roller hearth kiln oven or a microwave, but not restrictive. The calciner May be a continuous calciner or a batch calciner.

Then, the thus obtained lump calcined coke derived from the coal or the like is pulverized into particles using a pulverizing machine such as the atomizer.

The sizes of the green coke particles and the calcined coke particles are not particularly limited, but the respective average particle sizes as median sizes of the green coke particles and the calcined coke particles are set preferably within a range of 5 to 15 μm while the respective BET specific surface areas thereof are preferably set to 5 m$^2$/g or less. If the average particle sizes thereof are set less than 5 μm, the BET specific surface areas may be too increased. If the average particle sizes thereof are set more than 15 μm, the energy efficiency of the lithium secondary battery made of the green coke particles and the calcined coke particles may be lowered. The BET specific surface areas thereof may be set to 1 m$^2$/g or more in view of the formation of micro pores therein.

Then, the green coke particles and the calcined coke particles are mixed at a predetermined ratio. For example, the mixing ratio thereof (green coke particles:calcined coke particles) is preferably set within a range of 90:10 to 10:90 at mass ratio, more preferably within a range of 70:30 to 30:70 at mass ratio. If the ratio of the calcined coke is increased, the output characteristic of the obtained lithium secondary battery are enhanced. If the ratio of the green coke is increased, the discharge capacity and the initial characteristic of the obtained lithium secondary battery are enhanced. Depending on which of the characteristics is enhanced, the ratio of the calcined coke is set to 50% or more if the output characteristic of the lithium secondary battery is enhanced.

If the mixing ratio is set except the aforementioned range, the negative electrode of the lithium secondary battery made of the negative electrode active material may not be sufficiently reduced in electric potential so as not to enhance the actual battery voltage thereof and realize the sufficiently high output characteristic thereof. Moreover, the resistance of the lithium secondary battery may be increased at the end of charge and discharge so that the lithium secondary battery may not exhibit the stable charge/discharge characteristic thereof.

A phosphorous compound is added into the coke particles. The addition process is conducted by mixing the green coke, the calcined coke and the phosphorous compound at a ratio as will described below and putting the cokes and the phosphorous compound in a prescribed mold (first addition method).

The addition process may be conducted when the lump green coke derived from the coal or the like and the lump calcined coke derived from the coal or the like are obtained, instead of the step after the lump green coke and the lump calcined coke are pulverized (second addition method). In this case, the lump green coke and the lump calcined coke are put in a pulverizing machine while the phosphorous compound is put in the same pulverizing machine, so that the green coke particles and the calcined coke particles with the phosphorous compound therein can be obtained through pulverization.

Therefore, since the phosphorous compound can be added simultaneously when the lump green coke and the lump calcined coke are pulverized, the additional addition process of the phosphorous compound can be omitted, so that the total manufacturing process for the negative electrode active material of the lithium secondary battery can be simplified.

Here, the first addition method and the second addition method only differentiate the concrete addition means so as to differentiate the total manufacturing process for the negative electrode active material of the lithium secondary battery and not almost to differentiate the output characteristic, the discharge capacity, the initial efficiency and the capacitance retention rate of the lithium secondary battery made of the negative electrode active material.

The additive amount of the phosphorous compound is preferably set within a range of 0.1 to 6.0 parts by mass in equivalent amount of phosphor relative to 100 parts by mass of the total amount of the green coke and the calcined coke, more preferably within a range of 0.5 to 5.0 parts by mass thereto. If the additive amount is set less than the lower limited value, the trade-off relation between the discharge capacity and the initial efficiency of the obtained lithium secondary battery may not be enhanced when the phosphorous compound is added. On the other hand, if the additive amount is set more than the upper limited value, the low crystallization of the surface of the coke is progressed to reduce the output characteristic of the obtained lithium secondary battery.

As the phosphorous compound is desired a phosphorous compound classified into phosphoric acids which can easily make an aqueous solution and have high safety. As the phosphoric acids is preferably exemplified phosphoric acid (orthophosphoric acid), but may be appropriately selected from linear polyphosphoric acid, cyclic polyphosphoric acid and phosphoric acid ester. One of the listed phosphoric acids may be employed or the mixture of two or more thereof may be employed.

Then, the green particles and the calcined particles with the phosphorous compound therein are fired. The firing temperature is preferably set within a maximum achieving temperature within a range of 800 to 1400° C., more preferably within a range of 900 to 1400° C. If the firing temperature is set more than the upper limited value, the crystal growth in the coke particles is too progressed and adversely affects the battery characteristic balance of the obtained lithium secondary battery, e.g., causing the reduction of the initial efficiency thereof, which is undesirable in view of the mass production of the lithium secondary battery. On the other hand, if the firing temperature is set less than the lower limited value, the crystal growth in the coke particles is suppressed while the phosphorous compound cannot be added as desired in the carbonization of the cokes, thereby lowering the discharge capacity and not enhancing the trade-off relation between the discharge capacity and initial efficiency, which results in the adverse affect for the battery characteristic balance.

The holding time at the maximum achieving temperature is not limited, but preferably set to 30 minutes or more. Moreover, the firing atmosphere is not limited, but may be set to non-reactive atmosphere such as argon atmosphere or nitrogen atmosphere or non-oxidizing atmosphere which is realized in a non-airtight atmosphere such as in a rotary kiln oven or in an airtight atmosphere such as in a Riedhammer oven.

The negative electrode active material of the lithium secondary battery has an intensity ratio ($R=I_{1360}/I_{1580}$) of a diffraction peak in the vicinity of 1360 cm$^{-1}$ to a diffraction peak in the vicinity of 1580 cm$^{-1}$ within a range of about 1.1 to 1.4, the difftaction peaks being obtained by means of Raman spectroscopy using an argon laser. The diffraction peak in the vicinity of 1360 cm$^{-1}$ is originated from the turbostratic structure of the negative electrode active material and the diffraction peak in the vicinity of 1580 cm$^{-1}$ is originated from the graphite structure of the negative electrode active material.

Generally, when the coke particles are fired within a temperature range of 900 to 1400° C. to make the negative electrode active material of the lithium secondary battery, the crystallinity of the negative electrode active material is enhanced so that in many cases, the ratio "R" may be smaller than "1" In the present invention, however, although the coke particles are fired in the aforementioned temperature range, the ratio "R" becomes large within a range of 1.1 to 1.4. This is because the area in the vicinity of the addition area of the phosphorous compound is suppressed in crystal growth so that the ratio of the turbostratic structure is increased.

As will be described in Examples, hereinafter, when the inside of the negative electrode active material of the lithium secondary battery is suppressed in crystal growth by the addition of the phosphorous material, the output characteristic thereof is reduced, but in the present invention, adversely enhanced. In this point of view, it is turned out that the phosphorous compound is mainly located in the vicinity of the surface of the negative electrode active material of the lithium secondary battery, thereby contributing to the suppression of the crystal growth in the vicinity of the surface of the negative electrode active material not affecting the output characteristic of the lithium secondary battery made of the negative electrode active material, which results in the enhancement of the trade-off relation between the discharge capacity and the initial efficiency.

By adding the phosphorous compound into the negative electrode active material, the amount of hydrogen contained in the negative electrode active material can be reduced. As a result, the ratio of hydrogen ion to be reacted with an electrolysis solution can be reduced at charge and discharge so as to contribute to the improvement of the irreversible property relating to charge and discharge. For example, by adding the phosphorous compound, the amount of hydrogen contained in the negative electrode active material of the lithium secondary battery can be reduced to 3000 ppm or less.

In the case where the negative electrode active material is applied to the negative electrode of the lithium secondary battery, as a positive electrode active material may be used lithium-containing transition metal oxides $LiM(1)xO_2$ or $LiM(1)_yM(2)_{2-y}O_4$ (wherein M(1) and M(2) are a transition metal selected from the group consisting of Co, Ni, Mn, Ti, Cr, V, Fe, Zn, Al, Sn and In, respectively, and x and y are independently numbers in a range of 0-1), transition metal chalcogenides ($TiS_2$, $NbSe_3$, etc.), vanadium oxides ($V_2O_5$, $V_6O_{13}$, $V_2O_4$, $V_3O_8$, etc.) and lithium compounds thereof, Chevrel phase compound represented by the general formula $MxMo_6Ch_{8-y}$ (wherein x is a number in a range of 0-4, y is a number in a range of 0-1, M is a metal such as transition metal and Ch denotes a chalcogen), activated carbon and activated carbon fibers.

As an electrolyte for charging the space between the positive electrode and the negative electrode can be used singly or as a mixture of two kinds or more a conventionally well known electrolyte material such as $LiClO_4$, $LiBF_4$, $LiPF_6$, $LiAsF_6$, $LiB(C_6H_5)$, LiCl, LiBr, $Li_3SO_3$, $Li(CF_3SO_2)_2N$, $Li(CF_3CF_2CH_2OSO_2)_2N$, $Li(HCF_2CF_2CH_2OSO_2)_2N$, $Li[(CF_3)_2CHOSO_2]_2N$ or $LiB[C_6H_3(CF_3)_2]_4$.

The following compounds are examples of nonaqueous electrolytes and may be used singly or as a mixture of two kinds or more although there is no specific restriction on the selection of nonaqueous electrolytes; propylene carbonate, ethylene carbonate, butylene carbonate, chloroethylene carbonate, dimethyl carbonate, diethyl carbonate, ethyl methyl carbonate, 1,1-dimethoxyethane, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, anisole, diethyl ether, sulfolane, methylsulfolane, acetonitrile, chloronitrile, propionitrile, trimethyl borate, tetramethyl silicate, nitromethane, dimethylformamide, N-methylpyrrolidone, ethyl acetate, trimethyl orthoformate, nitrobenzene, benzoyl chloride, benzoyl bromide, tetrahydrothiophene, dimethyl sulfoxide, 3-methyl-2-oxazolidone, ethylene glycol, sulfites, and dimethyl sulfite.

In the case where the negative electrode of the lithium secondary battery is made of the negative electrode active material, as a carbonaceous binder is used fluorine-based resin powder made polyvinylidene fluoride (PVDF), etc., or a water-soluble bond such as polyimide, polylmide imide, siloxane polyimide, styrene-butadiene rubber (SBR) or carboxymethylcellulose. Then, the negative electrode active material and the binder are mixed in a solvent such as N-methylpyrrolidone (NMP), dimethylformamide, dimethylacetamide, water or alcohol to make a slurry. Then, the slurry is applied and dried onto a current collector.

The thus obtained negative electrode active material of the lithium secondary battery can be applied for any use, but more preferably for the use of vehicle installation and storage battery for electric power storage.

EXAMPLES

Hereinafter, examples (negative electrode active material of secondary battery), reference examples and comparative examples will be described. Here, the present invention is not restricted to these examples.

Example 1

A lump coke (green coke) manufactured by thermally treating a purified pitch, which was obtained by removing quinoline-insoluble components from a coal-derived heavy oil, at a temperature of 500° C. for 24 hours by means of delayed coking, was pulverized and regulated in size with a jet mill to make green coke particles with an average particle size of 9.9 μm.

Then, the lump green coke obtained in the same manner as described above was thermally treated for 1 hour or more by means of a rotary kiln oven under the condition that the temperature distribution in the oven is set so as to change from a temperature of 700° C. in the vicinity of the inlet of the oven to a temperature of 1500° C. (maximum achieving temperature) in the vicinity of the outlet of the oven to make a lump calcined coke. Then, the lump calcined coke was pulverized and regulated in size with a jet mill to make calcined coke particles with an average particle size of 9.5 μm.

Then, 17.9 parts by mass (2.5 parts by mass in equivalent amount of phosphor) of a phosphoric acid ester (14 mass active phosphor solid resin HCA (trade name) made by SANKO CO., LTD., chemical name: 9,10-dihydro-9-oxa-10-phosphaphenanthrene-10-oxide) were added to the mixture of 70 parts by mass of the green coke particles and 30 parts by mass of the calcined coke particles (that is, 100 parts by mass of coke material).

Then, the coke material with the phosphoric acid ester added therein was heated from room temperature to 1000° C. (maximum achieving temperature) at a heating rate of 400° C./min and kept for 2 hours as it is to be carbonized (fired), thereby making a negative electrode active material of lithium secondary battery.

Example 2

An intended negative electrode active material of lithium secondary battery was made in the same manner as in Example 1 except that the mixing ratio of the green coke particles and the calcined coke particles was varied to a ratio of 50:50 from 70:30 by mass ratio.

Reference Example 1

An intended negative electrode active material of lithium secondary battery was made in the same manner as in Example 1 except that 100 parts by mass of the green coke particles were used with no mixing of the calcined coke particles.

Comparative Example 1

An intended negative electrode active material of lithium secondary battery was made in the same manner as in Example 1 except that 100 parts by mass of the green coke particles were used with no mixing of the calcined coke particles and no adding of the phosphoric acid ester.

Comparative Example 2

An intended negative electrode active material of lithium secondary battery was made in the same manner as in Example 1 except that 100 parts by mass of the calcined coke particles were used with no mixing of the green coke particles and no adding of the phosphoric acid ester.

Examples 3 and 4

Intended negative electrode active materials were made in the same manner as in Examples 1 and 2, respectively, except that the firing temperature (maximum achieving temperature) of the coke material was varied to 1200 from 1000° C.

Reference Example 2

An intended negative electrode active material of lithium secondary battery was made in the same manner as in Example 3 except that 100 parts by mass of the green coke particles were used with no mixing of the calcined coke particles.

Comparative Example 3

An intended negative electrode active material of lithium secondary battery was made in the same manner as in Example 3 except that 100 parts by mass of the green coke particles were used with no mixing of the calcined coke particles and no adding of the phosphoric acid ester.

Comparative Example 4

An intended negative electrode active material of lithium secondary battery was made in the same manner as in Example 3 except that 100 parts by mass of the calcined coke particles were used with no mixing of the green coke particles and no adding of the phosphoric acid ester.

Examples 5 and 6

Intended negative electrode active materials were made in the same manner as in Examples 1 and 2, respectively, except that the firing temperature (maximum achieving temperature) of the coke material was varied to 1350° C. from 1000° C.

Reference Example 3

An intended negative electrode active material of lithium secondary battery was made in the same manner as in Example 5 except that 100 parts by mass of the green coke particles were used with no mixing of the calcined coke particles.

Comparative Example 5

An intended negative electrode active material of lithium secondary battery was made in the same manner as in Example 3 except that 100 parts by mass of the green coke particles were used with no mixing of the calcined coke particles and no adding of the phosphoric acid ester.

Comparative Example 6

An intended negative electrode active material of lithium secondary battery was made in the same manner as in Example 3 except that 100 parts by mass of the calcined coke particles were used with no mixing of the green coke particles and no adding of the phosphoric acid ester.

Next, the lithium secondary batteries using the negative electrode active materials obtained in Examples 1 to 6, Comparative Examples 1 to 6 and Reference Examples 1 to 3 were fabricated respectively as follows.

First of all, polyvinylidene fluoride was added as a binder to the negative electrode active material by 5 mass %, and the thus obtained mixture was kneaded using N-methylpyrrolidone as a solvent to make a slurry. The slurry was coated uniformly on a copper foil with a thickness of 18 μl to make an electrode sheet. Then, the electrode sheet was cut out in a form of circle to make a negative electrode with a diameter of 15 mm. In order to evaluate the electrode characteristics of only the negative electrode, a metallic lithium with a diameter of 15.5 mm was used as a counter electrode.

$LiPF_6$ with a concentration of 1 mol/l was added into the mixture of ethylene carbonate and diethyl carbonate (mixing volume ratio=1:1) and the thus obtained solution was used as an electrolysis solution. Then, a coil cell was made from propylene porous film as a separator. Next, the discharge characteristics for the thus obtained lithium secondary battery was evaluated when a constant current discharge of 30 mA/g and a constant voltage discharge of 0V were conducted under a constant temperature of 25° C. within a predetermined voltage range of which the upper limited voltage was set to 1.5 V.

The evaluated results were listed in Table 1 with the characteristics of the corresponding negative electrode active materials.

TABLE 1

|  | Carbon (part by mass) | Green coke (part by mass) | Calcined coke (part by mass) | Phosphorous compound (part by mass) | Temperature of firing (° C.) | XRD d002 | Raman ID/IG | DOD: 50 (V) | Output characteristic (W) |
|---|---|---|---|---|---|---|---|---|---|
| Comparative Example 1 | 100 | 100 | 0 | 0 | 1,000 | 0.345 | 0.91 | 0.31 | 22.4 |
| Reference Example 1 |  | 100 | 0 | 2.5 |  | 0.343 | 1.36 | 0.56 | 22.4 |
| Example 1 |  | 70 | 30 | 2.5 |  | 0.344 | 1.35 | 0.48 | 26.7 |
| Example 2 |  | 50 | 50 | 2.5 |  | 0.344 | 1.32 | 0.49 | 27.0 |
| Comparative Example 2 |  | 0 | 100 | 0 |  | 0.345 | 1.02 | 0.41 | 31.8 |

TABLE 1-continued

| | Green coke (part by mass) | Calcined coke (part by mass) | Phosphorous compound (part by mass) | Temperature of firing (°C.) | XRD d002 | Raman ID/IG | DOD: 50 (V) | Output characteristic (W) |
|---|---|---|---|---|---|---|---|---|
| Comparative Example 3 | 100 | 0 | 0 | 1,200 | 0.342 | 0.83 | 0.31 | 25.3 |
| Reference Example 2 | 100 | 0 | 2.5 | | 0.346 | 1.39 | 0.42 | 23.1 |
| Example 3 | 70 | 30 | 2.5 | | 0.345 | 1.32 | 0.43 | 27.9 |
| Example 4 | 50 | 50 | 2.5 | | 0.345 | 1.28 | 0.38 | 28.8 |
| Comparative Example 4 | 0 | 100 | 0 | | 0.344 | 0.94 | 0.26 | 30.8 |
| Comparative Example 5 | 100 | 0 | 0 | 1,350 | 0.341 | 0.73 | 0.28 | 28.0 |
| Reference Example 3 | 100 | 0 | 2.5 | | 0.343 | 1.26 | 0.36 | 26.4 |
| Example 5 | 70 | 30 | 2.5 | | 0.345 | 1.22 | 0.36 | 29.3 |
| Example 6 | 50 | 50 | 2.5 | | 0.345 | 1.13 | 0.35 | 28.9 |
| Comparative Example 6 | 0 | 100 | 0 | | 0.345 | 0.91 | 0.27 | 29.6 |

| | Discharge capacity (mAh/g) | Initial efficiency (%) | 1C retention rate (%) | 2C retention rate (%) | 3C retention rate (%) | 4C retention rate (%) | 5C retention rate (%) |
|---|---|---|---|---|---|---|---|
| Comparative Example 1 | 291 | 78.9 | 87.1 | 79.1 | 74.5 | 69.8 | 65.5 |
| Reference Example 1 | 369 | 77.7 | 92.7 | 78.0 | 75.3 | 72.1 | 70.0 |
| Example 1 | 344 | 82.2 | 94.9 | 86.5 | 84.9 | 83.2 | 81.7 |
| Example 2 | 331 | 80.8 | 98.1 | 81.6 | 85.0 | 83.5 | 82.6 |
| Comparative Example 2 | 232 | 80.8 | 98.1 | 97.7 | 97.2 | 96.9 | 95.3 |
| Comparative Example 3 | 255 | 83.5 | 91.4 | 85.7 | 81.4 | 77.4 | 74.0 |
| Reference Example 2 | 304 | 83.7 | 86.0 | 80.3 | 78.8 | 72.2 | 69.5 |
| Example 3 | 299 | 79.8 | 91.3 | 89.2 | 87.0 | 84.6 | 84.0 |
| Example 4 | 281 | 89.1 | 91.4 | 89.1 | 88.4 | 87.1 | 85.8 |
| Comparative Example 4 | 235 | 84.4 | 92.4 | 92.2 | 91.6 | 90.6 | 89.0 |
| Comparative Example 5 | 239 | 87.0 | 94.5 | 90.4 | 87.0 | 83.8 | 81.3 |
| Reference Example 3 | 273 | 83.3 | 89.5 | 85.9 | 83.2 | 80.9 | 78.2 |
| Example 5 | 271 | 91.0 | 92.0 | 90.7 | 88.8 | 87.7 | 86.6 |
| Example 6 | 250 | 80.2 | 88.3 | 88.3 | 86.5 | 85.4 | 85.4 |
| Comparative Example 6 | 235 | 87.6 | 92.5 | 91.9 | 91.1 | 89.5 | 85.6 |

Then, composition analysis was conducted for the negative electrodes of the corresponding lithium secondary batteries in Examples 1 to 2, 4, 6, Reference Example 1 and Comparative Examples 1, 2. The analysis results and the essential characteristics accompanied with the composition analysis were listed in Table 2.

TABLE 2

| | Carbon (part by mass) | Green coke (part by mass) | Calcined coke (part by mass) | Phosphorous compound (part by mass) | Temperature of firing (°C.) | XRD d002 | Raman ID/IG | DOD: 50 (V) | Output characteristic (W) |
|---|---|---|---|---|---|---|---|---|---|
| Comparative Example 1 | 100 | 100 | 0 | 0 | 1,000 | 0.345 | 0.91 | 0.31 | 22.4 |
| Reference Example 1 | | 100 | 0 | 2.5 | | 0.343 | 1.38 | 0.56 | 22.4 |
| Example 1 | | 70 | 30 | 2.5 | | 0.344 | 1.35 | 0.48 | 26.7 |
| Example 2 | | 50 | 50 | 2.5 | | 0.344 | 1.32 | 0.49 | 27.0 |
| Comparative Example 2 | | 0 | 100 | 0 | | 0.345 | 1.02 | 0.41 | 31.8 |
| Comparative Example 3 | | 100 | 0 | 0 | 1,200 | 0.342 | 0.83 | 0.31 | 25.3 |
| Reference Example 2 | | 100 | 0 | 2.5 | | 0.346 | 1.39 | 0.42 | 23.1 |
| Example 3 | | 70 | 30 | 2.5 | | 0.345 | 1.32 | 0.43 | 27.9 |
| Example 4 | | 50 | 50 | 2.5 | | 0.345 | 1.28 | 0.38 | 28.8 |
| Comparative Example 4 | | 0 | 100 | 0 | | 0.344 | 0.94 | 0.26 | 30.8 |
| Comparative Example 5 | | 100 | 0 | 0 | 1,350 | 0.341 | 0.73 | 0.28 | 28.0 |

TABLE 2-continued

| | | | | | | | |
|---|---|---|---|---|---|---|---|
| Reference Example 3 | 100 | 0 | 2.5 | | 0.343 | 1.26 | 0.36 | 26.4 |
| Example 5 | 70 | 30 | 2.5 | | 0.345 | 1.22 | 0.36 | 29.3 |
| Example 6 | 50 | 50 | 2.5 | | 0.345 | 1.13 | 0.35 | 28.9 |
| Comparative Example 6 | 0 | 100 | 0 | | 0.346 | 0.91 | 0.27 | 29.8 |

| | Discharge capacity (mAh/g) | Initial efficiency (%) | 1C retention rate (%) | 2C retention rate (%) | 3C retention rate (%) | 4C retention rate (%) | 5C retention rate (%) |
|---|---|---|---|---|---|---|---|
| Comparative Example 1 | 291 | 78.9 | 87.1 | 79.1 | 74.5 | 69.8 | 65.5 |
| Reference Example 1 | 369 | 77.7 | 92.7 | 78.0 | 75.3 | 72.1 | 70.0 |
| Example 1 | 344 | 82.2 | 94.9 | 86.5 | 84.9 | 83.2 | 81.7 |
| Example 2 | 331 | 90.8 | 98.1 | 81.6 | 85.0 | 83.5 | 82.6 |
| Comparative Example 2 | 232 | 80.8 | 98.1 | 97.7 | 97.2 | 96.9 | 95.3 |
| Comparative Example 3 | 265 | 83.5 | 91.4 | 85.7 | 81.4 | 77.4 | 74.0 |
| Reference Example 2 | 304 | 83.7 | 86.0 | 80.3 | 76.6 | 72.2 | 69.5 |
| Example 3 | 299 | 79.8 | 91.3 | 89.2 | 87.0 | 84.6 | 84.0 |
| Example 4 | 281 | 89.1 | 91.4 | 89.1 | 88.4 | 87.1 | 85.8 |
| Comparative Example 4 | 235 | 84.4 | 92.4 | 92.2 | 91.6 | 90.6 | 89.0 |
| Comparative Example 5 | 239 | 87.0 | 94.5 | 90.4 | 87.0 | 83.8 | 81.3 |
| Reference Example 3 | 273 | 83.3 | 89.5 | 85.9 | 83.2 | 80.9 | 78.2 |
| Example 5 | 271 | 91.0 | 92.0 | 90.7 | 88.8 | 87.7 | 88.6 |
| Example 6 | 250 | 80.2 | 88.3 | 88.3 | 86.5 | 85.4 | 85.4 |
| Comparative Example 6 | 235 | 87.6 | 92.5 | 91.9 | 91.1 | 89.5 | 85.6 |

As is apparent from Table 1, in each of the lithium secondary batteries relating to Examples which are obtained by mixing the green coke particles and the calcined coke particles, adding the phosphoric acid ester into the mixture thereof and firing the mixture with the phosphoric acid ester added therein, the DOD (Depth of Discharge): 50 is decreased and the output characteristic are increased as the mixing ratio of the calcined coke to the green coke is increased in comparison with each of the lithium secondary batteries relating to Comparative Examples. Namely, in Examples, the substantial electric voltage of each of the negative electrodes made of the carbon materials for negative electrode is decreased so that the actual battery voltage of the corresponding lithium secondary battery is increased, thereby enhancing the output characteristic thereof.

On the other hand, the discharge capacity (mAh/g) is decreased as the mixing ratio of the calcined coke to the green coke is increased, but the decreasing degree of the discharge capacity was suppressed by the addition of the phosphorous compound so that in Examples, each of the lithium secondary batteries can exhibit a discharge capacity of 250 (mAh/g) or more In Examples, moreover, each of the lithium secondary batteries can exhibit an initial efficiency of about 80% or more though it can exhibit the large discharge capacity of 250 (mAh/g) or more. Therefore, it is turned out that the trade-off relation between the discharge capacity and the initial efficiency can be improved conspicuously by the addition of the phosphorous compound so that the high initial efficiency can be maintained even though the discharge capacity is increased and vice versa.

In each of the lithium secondary batteries relating to Examples, moreover, the high capacity retention rate can be maintained not only in the case of the standard discharge current of 1 C but also in the case of the large discharge current within a range of 2 C to 5 C rate by the addition of the phosphorous compound into the green coke and the calcined coke.

As a result, by mixing the green coke particles and the calcined coke particles and adding the phosphorous compound to the mixture thereof, as shown in Examples, the lithium secondary battery with excellent performance balance relating to output characteristic, discharge capacity, initial efficiency and capacity retention rate can be obtained.

In each of the negative electrode active materials of the corresponding lithium secondary batteries obtained in Examples, furthermore, the intensity ratio ($R=I_{1360}/I_{1580}$) of a diffraction peak in the vicinity of 1360 $cm^{-3}$ to a diffraction peak in the vicinity of 1580 $cm^{-1}$, the diffraction peaks being obtained by means of Raman spectroscopy, falls in a range of about 1.2 to 1.4. Generally, when the coke particles are fired within a temperature range of 900 to 1400° C. to make the negative electrode active material of the lithium secondary battery, the crystallinity of the negative electrode active material is enhanced so that in many cases, the ratio "R" may be smaller than "1". In the present invention, however, although the coke particles are fired in the aforementioned temperature range, the ratio "R" becomes large within a range of 1.1 to 1.4. This is because the area in the vicinity of the addition area of the phosphorous compound is suppressed in crystal growth so that the ratio of the turbostratic structure is increased.

As described above, however, since the lithium secondary battery exhibits high output characteristic, the phosphorous compound is not contained in the inside of the negative electrode active material of lithium secondary battery so as to suppress the crystal growth therein, but mainly located in the vicinity of the surface of the negative electrode active material of lithium secondary battery, thereby contributing to the suppression of the crystal growth in the vicinity of the surface of the negative electrode active material not affecting the output characteristic of the lithium secondary battery made of the negative electrode active material.

Next, as is apparent from Table 2, the amount of hydrogen contained in the negative electrode active material is decreased by adding the phosphorous compound into the negative electrode active material. As a result, the ratio of hydrogen ion to be reacted with the electrolysis solution can be reduced at charge and discharge so as to contribute to the improvement of the irreversible property relating to charge and discharge. In Examples, by adding the phosphorous compound, the amount of hydrogen contained in the negative electrode active material of the lithium secondary battery can be reduced to 3000 ppm or less.

Although the present invention was described in detail with reference to the above examples, this invention is not limited to the above disclosure and every kind of variation and modification may be made without departing from the scope of the present invention.

What is claimed is:

1. A negative electrode active material of lithium secondary battery, consisting of:
    a coal-derived green coke, and
    a coal-derived calcined coke, wherein a mass ratio of said green coke to said calcined coke is in a range of from 90:10 to 10:90; and
    a phosphorous compound, said phosphorous compound being present in an amount in a range of from 0.1:100 to 6.0:100 parts by mass relative to the mass of said green coke and said calcined coke.

2. The negative electrode active material as set forth in claim 1,
    wherein the mass ratio of said green coke to said calcined coke in a range of from 70:30 to 30:70.

3. The negative electrode active material as set forth in claim 1,
    wherein the amount of said phosphorous compound is in a range of from 0.5:100 to 5.0:100 parts by mass relative to the mass of said green coke and said calcined coke.

4. The negative electrode active material as set forth in claim 1, wherein
    said green coke is a powdery green coke, and said calcined coke is a powdery calcined coke.

5. The negative electrode active material as set forth in claim 4,
    wherein said powdery green coke has a BET specific surface area of 5 $m^2$/g or less and said powdery calcined coke has a BET specific surface area of 5 $m^2$/g or less.

6. The negative electrode active material as set forth in claim 4,
    wherein said powdery green coke has an average particle diameter within a range of 5 to 15 µm and said powdery calcined coke has an average particle diameter within a range of 5 to 15 µm.

7. The negative electrode active material as set forth in claim 1, exhibiting an intensity ratio of a diffraction peak in the vicinity of 1360 $cm^{-1}$ to a diffraction peak in the vicinity of 1580 $cm^{-1}$ within a range of 1.1 to 1.4, the diffraction peaks being obtained by means of Raman spectroscopy.

8. A secondary battery for vehicle installation comprising a negative electrode active material of lithium secondary battery as set forth in claim 1.

9. The secondary battery as set forth in claim 8,
    wherein said negative electrode active material is used for at least one of an electric vehicle and a storage battery for electric power storage.

10. A method for manufacturing a negative electrode active material of lithium secondary battery, consisting of the steps of:
    mixing a coal-derived green coke and a coal-derived calcined coke to form a coke mixture, wherein a mass ratio of said green coke to said calcined coke in the coke mixture is in a range of from 90:10 to 10:90,
    adding a phosphorous compound to the coke mixture, said phosphorous compound being present in the coke mixture in an amount in a range of from 0.1:100 to 6.0:100 parts by mass relative to the mass of said green coke and said calcined coke; and
    firing the coke mixture with said phosphorous compound added therein.

11. The manufacturing method as set forth in claim 10,
    wherein the coke mixture with said phosphorous compound added therein is fired at a temperature within a temperature range of from 800 to 1400° C.

12. The manufacturing method as set forth in claim 10,
    wherein the mass ratio of said green coke to said calcined coke is in a range of from 70:30 to 30:70.

13. The manufacturing method as set forth in claim 10,
    wherein the amount of said phosphorous compound that is present in the coke mixture is in a range of from 0.5:100 to 5.0:100 parts by mass relative to the mass of said green coke and said calcined coke.

14. A negative electrode active material of lithium secondary battery, consisting of:
    a coal-derived green coke;
    a coal-derived calcined coke, wherein a mass ratio of said green coke to said calcined coke is in a range of 90:10 to 10:90;
    a phosphorous compound, said phosphorus compound being present in an amount in a range of 0.1:100 to 6.0:100 relative to the mass of said green coke and said calcined coke; and
    a hydrogen content, said hydrogen content being present in an amount in a range of 3000 ppm or less.

15. A method for manufacturing a negative electrode active material of lithium secondary battery, consisting of the steps of:
    pulverizing a coal-derived green coke and a coal-derived calcined coke to make a powdery green coke and a powdery calcined coke,
    mixing said powdery green coke and said powdery calcined coke to form a coke mixture, wherein a mass ratio of said powdery green come to said powdery calcined coke in the coke mixture is in a range from 90:10 to 10:90,
    adding a phosphorous compound to the coke mixture, said phosphorous compound being present in the coke mixture in an amount in a range of from 0.1:100 to 6.0:100 parts by mass relative to the mass of said green coke and said calcined coke; and
    firing the coke mixture with said phosphorous compound added therein.

* * * * *